(12) United States Patent
Hardtdegen et al.

(10) Patent No.: US 10,074,771 B2
(45) Date of Patent: Sep. 11, 2018

(54) SINGLE-PHOTON SOURCE SUITABLE FOR MASS PRODUCTION AND PRODUCTION METHOD

(71) Applicant: FORSCHUNGSZENTRUM JUELICH GMBH, Juelich (DE)

(72) Inventors: Hilde Hardtdegen, Aachen (DE); Martin Mikulics, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 0 days.

(21) Appl. No.: 14/651,434

(22) PCT Filed: Nov. 27, 2013

(86) PCT No.: PCT/DE2013/000725
§ 371 (c)(1),
(2) Date: Jun. 11, 2015

(87) PCT Pub. No.: WO2014/094705
PCT Pub. Date: Jun. 26, 2014

(65) Prior Publication Data
US 2015/0318437 A1  Nov. 5, 2015

(30) Foreign Application Priority Data
Dec. 20, 2012  (DE) .......... 10 2012 025 088

(51) Int. Cl.
*H01L 33/06* (2010.01)
*H01L 33/32* (2010.01)
(Continued)

(52) U.S. Cl.
CPC ............ *H01L 33/06* (2013.01); *H01L 33/007* (2013.01); *H01L 33/0075* (2013.01);
(Continued)

(58) Field of Classification Search
CPC ......... H01L 33/00; H01L 33/04; H01L 33/06; H01L 33/32; H01L 33/0075; H01L 33/007
See application file for complete search history.

(56) References Cited

U.S. PATENT DOCUMENTS 6,728,281 B1 * 4/2004 Santori ................. B82Y 10/00
257/13
6,868,103 B2 * 3/2005 Gerard .................. B82Y 20/00
257/14
(Continued)

FOREIGN PATENT DOCUMENTS

GB       2 443 220       4/2008
JP     2004-518275 A     6/2004
(Continued)

OTHER PUBLICATIONS

Tim Schroeder, et al.; "Ultra-bright and efficient single photon generation based on integrated nanodiamonds containing single defect centers", Optical Society of America/CLEO 2011.
(Continued)

*Primary Examiner* — Fazli Erdem
(74) *Attorney, Agent, or Firm* — Norris McLaughlin & Marcus, P.A.

(57) ABSTRACT

A single-photon source was developed and the source comprises at least one active solid body, which upon excitation with light having photons which each have excitation energy, emits a single photon having lower emission energy within a predefined time period. The active solid body is disposed on a surface or an interface of an electrically operated light source for photons having the excitation energy, so that the solid body can be excited through this surface or interface. It was found that the ease of handling and the ability to miniaturize electrical primary light sources can thus advantageously be combined with the ability of the (Continued)

active solid body to emit exactly one photon. Since the active solid body emits only a single photon within a predefined time period, it is no longer a disadvantage if the light source that is used for excitation emits a large number of photons per unit of time. This opens a way to mass-produce single-photon sources, among other things.

13 Claims, 3 Drawing Sheets

(51) Int. Cl.
  *H01L 33/00* (2010.01)
  *H01S 3/0933* (2006.01)
  *H01S 3/16* (2006.01)
  *H04B 10/70* (2013.01)
  *H04L 9/08* (2006.01)
  *H01L 33/04* (2010.01)
  *H01S 5/026* (2006.01)

(52) U.S. Cl.
  CPC .............. *H01L 33/04* (2013.01); *H01L 33/32* (2013.01); *H01S 3/0933* (2013.01); *H01S 3/169* (2013.01); *H04B 10/70* (2013.01); *H04L 9/0852* (2013.01); *H01L 2933/0058* (2013.01); *H01S 5/026* (2013.01)

(56) References Cited

U.S. PATENT DOCUMENTS

| | | | | |
|---|---|---|---|---|
| 7,019,333 | B1* | 3/2006 | Shields | B82Y 10/00 257/13 |
| 2002/0196827 | A1* | 12/2002 | Shields | G02B 5/18 372/45.01 |
| 2003/0127608 | A1* | 7/2003 | Shields | B82Y 10/00 250/493.1 |
| 2003/0152228 | A1 | 8/2003 | Gerard et al. | |
| 2004/0075464 | A1* | 4/2004 | Samuelson | B82Y 10/00 326/37 |
| 2004/0151461 | A1 | 8/2004 | Hill | |
| 2005/0253152 | A1* | 11/2005 | Klimov | B82Y 20/00 257/79 |
| 2006/0210083 | A1* | 9/2006 | Takemoto | B82Y 10/00 380/278 |
| 2007/0210299 | A1* | 9/2007 | Hirose | H01L 31/035281 257/10 |
| 2007/0277730 | A1* | 12/2007 | Rabeau | G02F 1/365 117/84 |
| 2008/0089367 | A1* | 4/2008 | Srinivasan | B82Y 20/00 372/19 |
| 2009/0315013 | A1* | 12/2009 | Tansu | B82Y 20/00 257/13 |
| 2010/0074293 | A1* | 3/2010 | Lochmann | B82Y 20/00 372/45.012 |
| 2011/0155999 | A1* | 6/2011 | Tansu | H01L 33/22 257/13 |
| 2011/0156000 | A1* | 6/2011 | Cheng | H01L 33/22 257/13 |
| 2012/0037885 | A1* | 2/2012 | Schardt | H01L 27/156 257/13 |
| 2012/0112165 | A1* | 5/2012 | Charlton | H01L 27/14603 257/21 |
| 2012/0153254 | A1* | 6/2012 | Mastro | H01L 33/40 257/13 |
| 2012/0161663 | A1* | 6/2012 | Gregersen | B82Y 20/00 315/246 |
| 2013/0056704 | A1* | 3/2013 | Shalaev | H04B 10/70 257/13 |
| 2015/0021549 | A1* | 1/2015 | Zhang | H01L 33/06 257/13 |
| 2015/0168840 | A1* | 6/2015 | Hardtdegen | G03F 7/20 250/492.1 |

FOREIGN PATENT DOCUMENTS

| | | |
|---|---|---|
| JP | 4972733 B2 | 7/2012 |
| WO | 02/056238 A2 | 7/2002 |
| WO | WO-2007/062625 | 6/2007 |
| WO | 2008/117402 A1 | 10/2008 |

OTHER PUBLICATIONS

Ferruccio Pisanello, et al.; "Single colloidal quantum dots as sources of single photons for quantum cryptography", Proceedings of Spie vol. 7947, pp. 794709-1-794709-7.

* cited by examiner

SINGLE-PHOTON SOURCE SUITABLE FOR MASS PRODUCTION AND PRODUCTION METHOD

The invention relates to a single-photon source and to a production method for single-photon sources.

BACKGROUND OF THE INVENTION

Photon sources, which supply single photons at a defined point in time in response to an electrical signal, are needed for spectroscopic applications, and in particular for securely transmitting quantum cryptography keys. Light-emitting diodes (LEDs) are easy to miniaturize, and can be switched very quickly and electrically excited so as to emit very short light pulses. However, the number of photons they emit per unit of time is so large that, while few photons are emitted within the technologically minimally possible pulse duration, this number is still considerably more than one. The more photons are emitted per light pulse, the more limited is the accuracy of spectroscopy or the absolute security of the transmission of keys.

Quantum effects occur in some active solid bodies, as a result of which only one radiative transition at a time takes place at a particular point in time during electrical or optical excitation, during which one photon is released. This means that it is possible to define a time interval during which only a single photon is emitted in each case, and thus the stated requirement is met perfectly. Such a transition can be a recombination of an electron and a hole in a semiconductor, for example, which can only be excited again after a photon has been emitted. These quantum effects, however, require the active solid body to have nanoscale dimensions. The drawback of this is that it becomes very difficult to make electrical contact with such an active solid body for the purpose of excitation. Taking an indirect approach using optical excitation necessitates a separate excitation unit, which converts an electrical signal into light for the excitation. Lucrative mass production of single-photon sources that in each case emit exactly one photon in response to electrical excitation is not conceivable in either of these two ways.

It is thus the object of the invention to make single-photon sources that emit exactly one photon in response to electrical excitation suitable for mass production.

This object is achieved according to the invention by a single-photon source and by a production method. Further advantageous embodiments are disclosed.

SUMMARY OF THE INVENTION

Within the scope of the invention, a single-photon source was developed. The source comprises at least one active solid body, which upon excitation with light having photons which each have excitation energy, emits a single photon having lower emission energy within a predefined time period. The duration of this time period depends on the specific application, and more particularly on the desired data rate (transmission speed) during data transmission. The duration can be selected from a range between 1 ps and 100 ms, for example. If data is to be transmitted ultra-rapidly, for example, it is possible to use the light pulses in the order of 1 ps, which can presently be generated by way of femtosecond lasers on a laboratory scale, as excitation pulses for the emission; it is then useful for the active solid body to emit exactly one photon during this one picosecond. With the presently available commercial-scale optical data transmission, the light pulses used last in the order of 1 ns. The important aspect in quantum cryptography is to reliably transmit a key that is only a few hundred to a few thousand bits long. It may be useful for this purpose for the active solid body to emit only a single photon even with a relatively long excitation lasting 1 to 100 ms.

According to the invention, the active solid body is disposed on a surface or an interface of an electrically operated primary light source for photons having the excitation energy, so that the solid body can be excited through this surface or interface. This primary light source can in particular be a permanent light source and/or emit multiple photons per unit of time at a particular point in time. A permanent light source serving as the primary light source is suited, for example, for pump-probe experiments or for defining a time normal; single photons are then emitted periodically at a clock rate that depends on the life span of the radiative state of the active solid body. However, the primary light source can also be modulated in terms of the intensity thereof, for example for data transmission, and in particular it can be pulsed.

It was found that the ease of handling and the ability to miniaturize electrical primary light sources can thus advantageously be combined with the ability of the active solid body to emit exactly one photon within a short time period.

This process notably takes advantage of the circumstance that the arrangement according to the invention poses only minor demands on the mechanical handling of the active solid body, and thus considerably smaller active solid bodies can be used than those according to the existing related art. The active solid body is not able to absorb any further excitation energy at the site at which a transition takes place in the active solid body with emission of a photon (a recombination, for example), since the corresponding state is not free. The number of these states is now limited to the upside by the size of the active solid body: the smaller the active solid body, the further apart the energy levels predefined by the periodic boundary conditions will be from each other. In the extreme case, only a single energy level that is excitable by the primary light source exists within the entire active solid body, so that it is not possible to simultaneously emit multiple photons at any point in time. If the primary light source itself emits a large number of photons per unit of time, this is no longer a disadvantage, as long as the active solid body is sufficiently small.

Since the photons from the primary light source have a different wavelength (energy) than the single photons emitted by the active solid body, they can be suppressed by wavelength-dependent filtering, so that they do not reach the further processing stages for the single photons. For example, wavelength filters, coatings or cavities can be used for this purpose. In the simplest case, it suffices to dispose a glass fiber in the vicinity of the active solid body, such that only the photons emitted by the active solid body are coupled into the light-conducting core of the glass fiber, but not the photons from the primary light source having a wavelength that does not match the dimensions of the core.

In a particularly advantageous embodiment of the invention, the light source has at least one junction between two differently doped semiconductors, which emits the light. In particular, the light source can advantageously be a light-emitting diode (LED). Such structures can be mass-produced in miniaturized form in a proven manner. Likewise, the active solid bodies themselves can be mass-produced.

In a further particularly advantageous embodiment of the invention, at least one active solid body is disposed on the surface or interface of the light source, the solid body being at least 10 µm, and preferably at least 50 µm, away from the next active solid body. The single photon from exactly one active solid body can then be coupled into the light-conducting core of a glass fiber, without a further active solid body simultaneously coupling the single photon thereof into the same glass fiber. In this way, for example, a quantum cryptography key can be securely transmitted through the glass fiber.

In a further particularly advantageous embodiment of the invention, the surface or interface of the light source is locally modified to accommodate the active solid body. For example, topographical features, such as elevations or depressions, can be introduced into the surface or interface. However, it is also possible to apply another layer, for example, as a mask to the surface or interface, the mask in turn including topographical features. The local modification distinguishes individual sites on the surface or interface. If one or more active solid bodies are brought in contact with the surface or interface in a suitable manner, they can be deposited precisely in the distinguished sites. In contrast, if the surface is not modified whatsoever, and a plurality of active solid bodies are supplied, for example in the form of nanoparticles in colloidal solution, agglomerations composed of multiple active solid bodies form on the surface or interface of the light source. With optical excitation through the surface or interface, the number of photons emitted at the site of such an agglomeration corresponds to the number of active solid bodies present.

The local modification is thus advantageously designed so as to favor the deposition of active solid bodies that are brought in contact with the surface or interface. This is the case, for example, when a larger amount of binding energy is released when an active solid body makes contact with a local modification than when this active solid body makes contact with a region on the surface or the interface that has not been locally modified. Ideally, binding energy is only released at all when the active solid body comes in contact with a local modification, but not when it comes in contact with other regions on the surface or interface.

As an alternative or in combination therewith, the local modification is advantageously designed so as to form a minimum in a potential field for the active solid body. If the local modification is a depression in the surface or interface, for example, and active solid bodies approach the surface or interface from above, an active solid body may drop into such a depression and is then located in the gravitational field of the earth in a local potential minimum. The active solid body is thus fixed at least on a provisional basis, and can be permanently adhesively attached, for example, after the remaining active solid bodies, which did not drop into depressions, have been removed.

In a further particularly advantageous embodiment of the invention, the local modification is designed so as to define the spatial region from which the primary light source emits light. It is then possible to dispose a plurality of active solid bodies next to each other in a tight space, without the excitation of one of these active solid bodies also resulting in the unintended excitation of further active solid bodies by scattered light.

The active solid body advantageously has at least one preferred direction in such a way that a photon from the primary light source incident from this preferred direction is more likely to excite the emission of a single photon than a photon incident from another direction. Ideally, almost exclusively light that the primary light source irradiates from the preferred direction into the active solid body is converted into single photons. It is then possible to operate a plurality of single-photon sources according to the invention next to each other in a tight space, without these influencing each other.

The active solid body is advantageously a low-dimensional quantum confinement semi-conducting system or a nanadiamond having a color center. A color center is a defect that allows a radiative transition, in particular radiative recombination. Such a defect can be a lattice vacancy, for example, and more particularly a vacancy in a silicon or nickel lattice.

Within the scope of the invention, a method was also for producing a single-photon source from a light source that emits photons having excitation energy. This method is particularly suitable for producing single-photon sources according to the invention. The disclosure that is provided for the single-photon sources therefore expressly applies also to the method, and vice versa.

In the method, a surface or interface of the light source that emits light is initially modified locally at one or multiple sites. Subsequently, one or more active solid bodies that emit, within a predefined time period, a single photon having lower emission energy when excited by photons having the excitation energy, are brought in contact with the surface or interface, so that they are deposited at the locally modified sites.

This deposition can in particular consist in binding energy being released, or the active solid body entering a local minimum of a potential field.

The local modification can consist of topographical features, for example elevations or depressions. These do not necessarily have to be located on the surface or interface of the light source itself, but can also be introduced into an additional layer, which is applied specifically for this purpose to the surface or interface as a mask.

However, the local modification does not necessarily have to be permanent. It can quite possibly be temporary, for example when the surface or interface is electrically charged locally for the purpose of local modification.

In a particularly advantageous embodiment of the invention, the deposited active solid body is, or the deposited active solid bodies are, glued to the light source. The energetic favoring that the active solid body experiences as a result of the deposition is not arbitrarily high, and may potentially be overcome during later handling of the finished single-proton source, so that the active solid body is lost. For example, the active solid body can drop out of a depression if the light source is subsequently turned upside down. The adhesive bond cements the initially provisional deposition of the active solid body or bodies.

The active solid bodies are advantageously removed from regions on the surface or interface that were not locally modified. The single-photon source produced will then emit photons having the emission energy only from locally modified sites. In this way, it is possible to ensure, for example, that only a single active solid body couples light into the glass fiber that is moved to a particular site.

In a particularly advantageous embodiment of the invention, the active solid bodies are brought in contact with the surface or interface while in colloidal solution. They are then in a state of suspension in a solvent. Any solvent that prevents the active solid bodies from agglomerating among each other, promotes the uniform distribution of the active solid bodies, and can be easily removed is suited for this purpose. The active solid bodies should either not electrochemically interact with the solvent or should do so only in a repelling manner.

For every active solid body, the wavelength that the emitted single protons are to have specifies, by virtue of the quantum mechanical periodic boundary conditions, the maximum size up to which the solid body is able to simultaneously emit no more than one proton at a particular time. The largest lateral extension of each active solid body is thus typically smaller than 100 nm. Advantageously no more than $10^{21}$, preferably no more than $10^{20}$, and still more preferably no more than $10^{19}$ active solid bodies per cubic centimeter are present in the solution. $10^{21}$ active solid bodies per cubic centimeter is optimal for 1 nm small active solid bodies; this optimum is proportionally smaller for larger active solid bodies.

If a locally modified site on the surface or interface offers even only a low energetic incentive for the deposition of an active solid body, the active solid body may follow this incentive, without having to overcome interfering external resistances. All non-deposited active solid bodies remain in the state of suspension and can be removed by way of the solvent, without exerting forces on already deposited active solid bodies that can detach these again.

The subject matter of the invention will be described hereafter based on the drawing FIGURES, without thereby limiting the subject matter of the invention.

DESCRIPTION OF THE PREFERED EMBODIMENT

Figure 1A:
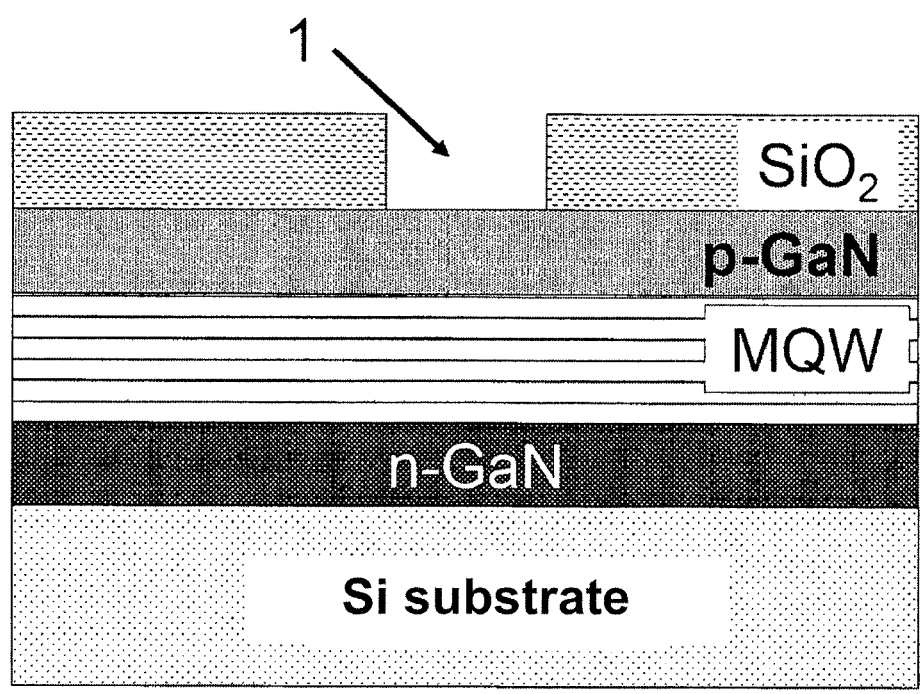
FIGS. 1a, 1b and 1c show an exemplary embodiment of the single-photon source in different stages of the production process according to the invention.
Figure 1B:
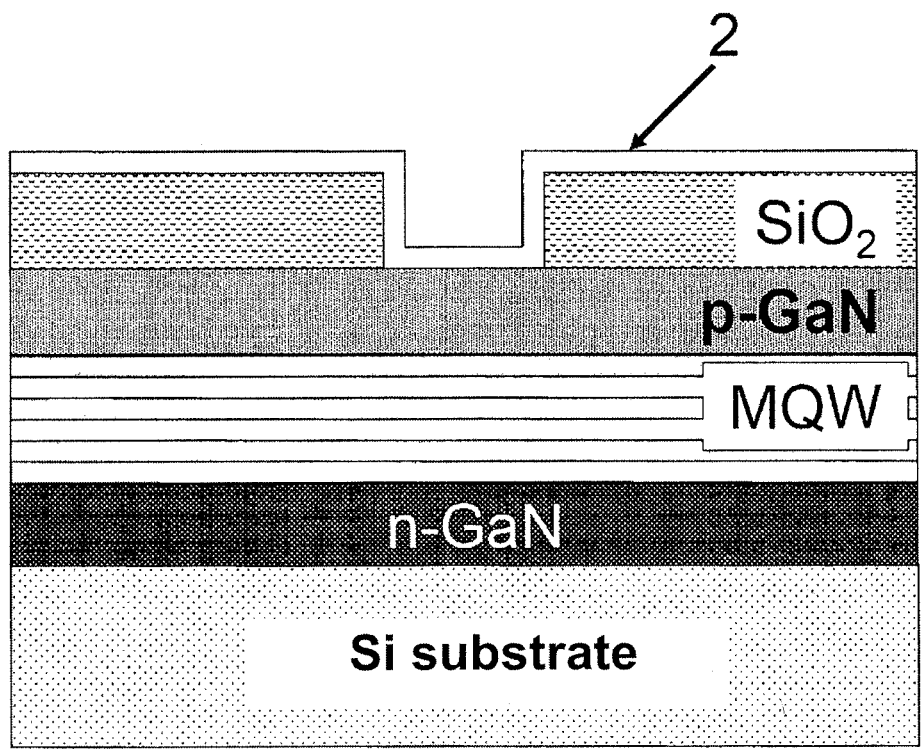
Figure 1C:
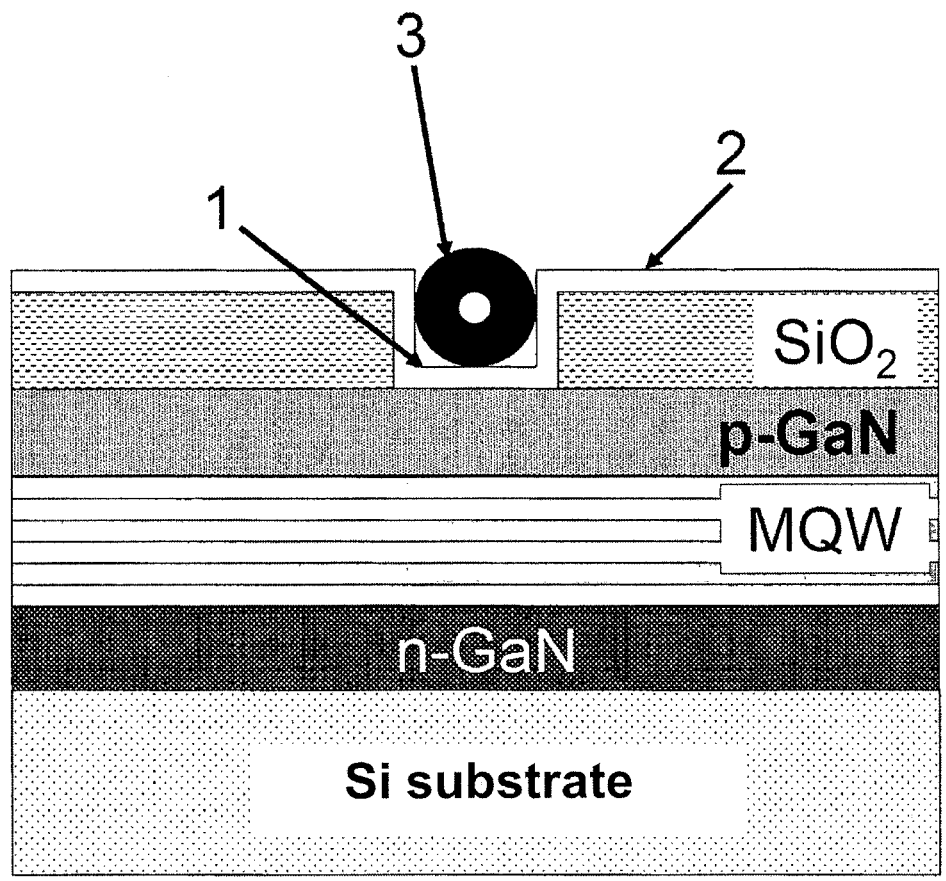

FIGS. 1a, 1b and 1c show a schematic sectional view of an exemplary embodiment of the single-photon source according to the invention in different stages of the production process. A multi-quantum well (MQW) LED structure is grown on an Si substrate between two layers made of n-GaN and p-GaN, the structure emitting light when a voltage is applied between n-GaN and p-GaN. The p-GaN layer is electrically insulated by a cover layer made of $SiO_2$, with the exception of a recess 1 subsequently introduced into this cover layer (FIG. 1a). A subsequently applied transparent top electrode 2, which covers both the $SiO_2$ and the walls and the bottom of the recess 1, makes contact with the p-GaN only at the bottom of the recess. When a voltage is applied between this top electrode 2 and the n-GaN, the MQW structure is thus also excited to emit light only in the region of the recess (FIG. 1b). The primary light of the LED penetrates the transparent top electrode 2 and reaches the active solid body 3 that is introduced into the recess 1 after the top electrode 2 has been applied (FIG. 1c). This solid body can be a colloidal nanoparticle, which previously was precipitated from a solution. However, it can also be a nanodiamond having a color center, which is a vacancy in a silicon or nickel lattice, for example. In this way, the active solid body 3 is excited to emit exactly one photon within a predefined time period.

The invention claimed is:

1. A single-photon source comprising:
    a primary light source having an electrically operated configuration for emitting photons having excitation energy; and
    a single first active solid body disposed on a surface or an interface of said primary light source such that the single first active solid body is deposited in a depression provided in the surface or the interface of said primary light source,
    wherein:
    the single first active solid body is configured to be excitable through the surface or the interface by light having photons each having excitation energy emitted by the primary light source, which excitation causes the single first active solid body to emit a single photon having lower emission energy in a predefined time period by a radiative transition in the single first active solid body;
    said single first active solid body is configured to have only one energy level that is excitable by the primary light source through said surface or said interface;
    the single first active solid body is at least 50 μm away from a second active solid body,
    the depression defines a light emitting spatial region of the primary light source that emits the light having the photons each having the excitation energy, wherein the light emitting spatial region has an axis extending away from the surface or the interface of the primary light source and the single first active solid body is located, at least partially, in the axis of the light emitting spatial region of the primary light source, and
    the single first active solid body consists of a nanoparticle or a nanodiamond having a color center.

2. The single-photon source according to claim 1, wherein a largest lateral extension of the single first active solid body is smaller than 100 nm.

3. The single-photon source according claim 1, wherein the primary light source has at least one junction between two differently doped semiconductors, which emits light.

4. The single-photon source according to claim 3, wherein the primary light source is a light-emitting diode (LED).

5. The single-photon source according to claim 1, wherein the depression is configured so as to favor deposition of the single first active solid body, which is brought in contact with the surface or interface.

6. The single-photon source according to claim 1, wherein the depression is configured in such a way that a larger amount of binding energy is released when the single first active solid body makes contact with a local modification than when said single first active solid body makes contact with a region on the surface or the interface that has not been locally modified.

7. The single-photon source according to claim 1, wherein the depression is configured so as to form a minimum in a potential field for the single first active solid body.

8. The single-photon source according to claim 1, wherein the single first active solid body has at least one preferred direction in which a photon emitted by the primary light source incident from said at least one preferred direction is more likely to cause emission of a single photon from said single first active solid body than a photon incident from another direction.

9. The single-photon source according to claim 1, wherein the primary light source comprises:
    at least one junction between two differently doped semiconductors, said one junction configured to emit light comprising said photons; and
    a top electrode that forms said surface or interface; and
    wherein the primary light source is locally modified with the depression at said interface or surface to accommodate the single first active solid body, said top electrode being transparent at least at a portion accommodating the single first active solid body.

10. The single-photon source according to claim 1, wherein:
- the second active solid body consists of a single second active solid body;
- the depression is provided at a first site on the surface or the interface of the primary light source;
- a second local modification, comprising topographical features that accommodate the single second active solid body of the second active solid body, is provided at a second site on the surface or the interface of the primary light source; and
- a region on the surface or the interface of the primary light source, that is free of local modification, separates the depression at the first site and the second local modification provided at the second site such that the single first active solid body is at least 50 μm away from the single first active solid body.

11. The single-photon source according to claim 1, wherein the photons from the primary light source have a different wavelength than the single photon from the single first active solid body.

12. The single-photon source according to claim 1, wherein the single first active solid body consists of the nanodiamond having the color center, the color center is a defect configured to allow the radiative transition and the radiative transition is a radiative recombination.

13. The single-photon source according to claim 1, wherein the depression provided in the surface or the interface of said primary light source is a U-shaped depression.

* * * * *